United States Patent Office 3,412,101
Patented Nov. 19, 1968

3,412,101
SUBSTITUTED 2-TRIFLUOROMETHYL
BENZIMIDAZOLES
Kenneth D. Zwahlen, Modesto, Calif., assignor to Shell Oil Company, New York, N.Y., a corporation of Delaware
No Drawing. Filed Apr. 22, 1966, Ser. No. 544,360
3 Claims. (Cl. 260—309.2)

This invention relates to novel trifluoromethyl benzimidazoles, useful as herbicides. More particularly, it relates to novel trifluoromethyl benzimidazales having an alkylsulfonyl substituent on the six-membered ring.

The high cost of employing hand labor to control weeds in crops has led to an increasing use of chemical herbicides. A variety of such herbicides are now known and used. Such herbicides include inorganic chemicals such as ammonium sulfamate; the sodium salts such as sodium borates, sodium arsenite, sodium chlorate, sodium nitrate; and sulfuric acid. Organic chemicals are, however, considerably more selective. Such compounds as the auxin type growth regulators, e.g. the phenoxyalkanoic acids and their esters; the triazines such as atrazine and simazine; maleic hydrazine and the ureas, such as monuron, diuron and reburon are all extensively used in agriculture.

To be useful in agriculture, a herbicide should be effective both prior to the emergence of the crop, that is, between sowing of the crop and its emergence, and after the emergence of the crop, that is, after the crop is above ground. Furthermore, the herbicide should be selective, that is, effective against weeds but not harmful to the crop.

The most recent classes of compounds to show promise as herbicides have been the benzimidazoles and substituted benzimidazoles. Exemplary of such compounds are the (benzimidazolylthio) alkyl acrylates described in the patent to Miller, U.S. 3,161,495, issued Dec. 15, 1964; and the 5-alkyl-2-aryloxyalkyl benzimidazoles of the patent to Moyle et al., U.S. 3,182,070, issued May 4, 1965.

Other types of benzimidazoles which are said to be useful as herbicides are shown in such publications as the following:

Netherlands patent appl. 6,413,816, opened May 31, 1965
Republic of So. Africa patent appl. 64/4,256, publ. June 2, 1965
Republic of So. Africa patent appl. 64/6,212, publ. Aug. 11, 1965
Republic of So. Africa patent appl. 64/480, publ. Aug. 18, 1965
Australian patent appl. 40,642/64, publ. Aug. 12, 1965

While many of these compounds show considerable promise as selective herbicides, very few have combined the desirable properties required for a practical weed killer. A new class of substituted benzimidazoles has now been found which appears to display the desirable combination. Accordingly, it is an object of the present invention to provide a new class of benzimidazoles, useful as herbicides. Another object of the invention is the provision of a class of trifluoromethyl-substituted benzimidazoles having useful biological properties. The provision of novel herbicidal composition containing such benzimidazoles is another object of the invention, as is the use of the benzimidazoles as herbicides for controlling unwanted vegetation. Other objects will be apparent from the following detailed description of the invention.

These objects are accomplished in the invention by a 2-trifluoromethyl-5-alkylsulfonyl benzimidazole wherein the alkyl radical has up to 2 carbon atoms, i.e., 2-trifluoromethyl-5-methylsulfonyl benzimidazole and 2-trifluoromethyl-5-ethylsulfonyl benzimidazole.

Compounds of this type have been found to be particularly effective against deep-rooted weeds, which are known to be difficult to control. Especially effective in this regard is 2-trifluoromethyl-5-methylsulfonyl benzimidazole.

While the benzimidazole compounds of the invention are in general effective herbicides, their effectiveness will depend on their mode of application. When used in relatively high dosages, the compounds are powerful general herbicides, exhibiting activity both when applied pre-emergence and post-emergence. At lower dosages, the benzimidazoles display selective properties. Since they are not very volative, the benzimidazoles of the invention tend to remain in that part of the soil into which they are introduced. Consequently, by appropriate selection of the point of deposition relative to the seeds of wanted and unwanted plants, worthwhile control of weeds may be achieved. For example, as is well known, only those weed seeds which are present within about one-quarter inch of the surface of the soil will germinate, whereas the seeds of cereal, and other crops, for example, ordinarily are sown about one-half to three-quarters of an inch below the surface of the soil, and germinate well under these conditions. By introducing a benzimidazole compound only into the top one-quarter inch of the soil, and avoiding excessive watering, germination of the weed seeds can be prevented, while germination of the crop seeds will not be affected. Thus, even those of the benzimidazoles of this invention that are not very selective in their action can be used to selectively remove weeds from cereal grains or other crops. Of course, if complete kill of all plants in a given portion of soil is described, it is necessary only to introduce one or more of the benzimidazoles throughout that portion of soil.

Liquid compositions containing up to 50% by weight of the desired amount of benzimidazole as active agent may be prepared by dissolving the chemical in an inert organic solvent such as xylene, acetone, isopropyl alcohol, carbon tetrachloride or the like. By the use of suitable emulsifying and dispersing agents the benzimidazoles can be emulsified or dispersed in water and the amulsion applied to the soil to be treated to provide effective control of the weeds or weed seeds therein. Any of the usual emulsifying and dispersing agents commonly employed in forming aqueous emulsions and suspensions of water-insoluble materials can be used for this purpose. Generally but a small concentration of the emulsifying agent is required, as little as 0.05 percent of the weight of the final formulation being effective in many cases, while seldom will more than about 10% of the weight of the final formulation be required. Usually the concentration of the emulsifying or dispersing agent will be from about 0.5 to about 5% of the weight of the formulation.

For convenience in formulating the benzimidazoles in aqueous solvents, the alkali metal salts of these compounds may be employed. These salts are readily soluble in water and are stable in aqueous formulations.

Solid formulations may be dusts, granules, or wettable powders. The active ingredient content in the case of dusts or granules may vary from about 1 percent to about 20 percent by weight of the total formulation. Wettable powders may contain about 25 percent to about 90 percent of the active ingredient on the same basis. Suitable diluents for agricultural solid formulations include clays such as the kaolinites and attapulgites, mineral diluents such as talc, pyrophyllite and chemically modified minerals such as precipitated calcium carbonate. Wettable powder formulations may contain in addition wetting, sticking and/or suspending agents.

The quantity of the alkylsulfonyl benzimidazole herbicide used per acre will depend upon the particular weed or complex of weeds to be controlled, the stage of growth of the plant, ecological factors such as temperature, soil type, rainfall and the like. Generally dosages within the range of 0.1 of a pound to about 20 pounds or more per acre will give adequate weed control.

A benzimidazole compound of the invention may be the sole active ingredient in a formulation, more than one such compound may be employed, or such a compound or compounds may be incorporated with other pesticides.

To illustrate the novel trifluoromethyl alkylsulfonyl benzimidazoles of the invention as well as their preparation and manner of use, the following examples are given. It should be understood, however, that these examples are merely illustrative and are not to be regarded as limitations to the appended claims since the basic teachings thereof may be varied at will, as will be understood by one skilled in the art. In the examples, the proportions are expressed in parts by weight unless otherwise noted.

Example I.—2-Trifluoromethyl-5-methylsulfonyl benzimidazole

To 50 g. (0.22 mole) of 4-methylsulfonyl-2-nitroaniline suspended in 500 ml. of ethanol in a 2–1 beaker was added 10 ml. of an aqueous solution containing 85% wt. hydrazine hydrate. About 1 g. of sponge nickel catalyst was added and the mixture was stirred with a magnetic stirrer. The temperature of the system rose slowly and bubbling occurred.

Over a period of the next hour, an additional 50 ml. of the hydrazine hydrate solution was added. During the course of the reaction the color of the system changed from yellow to almost colorless. At the end of the reaction, as evidenced by termination of gas evolution, the catalyst was filtered from the system and the product recovered by crystallization. The dry product 4-methylsulfonyl-o-phenylenediamine was obtained in 91% yield (39 g.). Additional of this intermediate was prepared in the same manner.

Eighty-five grams (0.457 mole) of the 4-methylsulfonyl-o-phenylenediamine prepared in this manner was dissolved in a solution prepared by diluting 150 ml. of conc. hydrochloric acid with 300 ml. water. To the resulting solution was added 59 g. (0.5 mole) of trifluoroacetic acid, and the solution so obtained was refluxed for four hours. Upon cooling the solution, a solid precipitated out. The mixture was chilled on an ice bath and filtered, and the solid dried at 70° C. under reduced pressure. Upon recrystallization from water, 76 g. (63% yield) of tan crystalline product was obtained. The product was determined to be 2-trifluoromethyl-5-methylsulfonyl benzimidazole having the following properties:

*Elemental analysis.*—Calculated for $N_2SO_2F_3C_9H_7$: percent weight, N, 10.6; S. 12.1. Found: percent weight, N, 10.9; S, 11.9. Melting point: 182–183° C.

Example II.—2-trifluoromethyl-5-ethylsulfonyl benzimidazole

Beginning with 4-methylsulfonyl-2-nitroaniline, 2-trifluoromethyl-5-ethylsulfonyl benzimidazole was prepared in the manner described in Example I. The product was a white crystalline compound having the following properties:

*Elemental anaylsis.*—Calculated for $N_2SO_2F_3C_{10}H_9$: percent weight, C, 43.2; H, 3,24; N, 10.08. Found: percent weight, C, 42.9; H, 3.3; N, 9.9. Melting point: 172.5–173.5° C.

Example III.—Herbicidal activity: Pre-emergence

The pre-emergence herbicidal activity of the compounds of the invention was evaluated by planting weed seeds in soil treated with the candidate herbicides at the rate of 10 pounds per acre. Seeds of watergrass (*Echinochloa crusgalli*) and cress (*Lepidium sativum*) were germinated in treated soil under controlled conditions of temperature and light for 10–11 days prior to evaluation of the effectiveness of the treatments. At this time, the germination was noted and the treatments were rated on a 0 (no effect) to 9 (all dead) scale. The results are summarized in Table I.

TABLE I.—PRE-EMERGENCE SOIL HERBICIDE TESTS

| Test Compound | Herbicide Rating | |
|---|---|---|
| | 10 lbs./A Water grass | 10 lbs./A Cress |
| 5-methylsulfonyl-2-trifluoromethyl-benzimidazole | 8 | 9 |
| 5-ethylsulfonyl-2-trifluoromethyl-benzimidazole | 8 | 9 |

From these data, it will be seen that the compounds evaluated are surprisingly effective as pre-emergence herbicides.

Example IV.—Further tests

In advanced tests the compounds of the invention were evaluated for pre- and post-emergency activity against a number of important weeds. In these tests, the dosage required to control 95 percent of the weeds ($LD_{95}$) in terms of pounds per acre was determined. The soil was sprayed at graduated dosages in the case of the pre-emergence tests; in the post-emergence tests, growing plants were sprayed at varying dosages. Table II summarizes the pre-emergence tests results while the post-emergence data are tabulated in Table III.

TABLE II.—PRE-EMERGENCE
[Pounds per acre for 95% germination inhibition]

| Test Compound | Rye-grass | Crab-grass | Dock | Pig-weed | Mus-tard |
|---|---|---|---|---|---|
| 5-methylsulfonyl-2-trifluoromethylbenzimidazole | 2.5 | 0.8 | 0.4 | 0.4 | 1.3 |
| 5-ethylsulfonyl-2-trifluoromethylbenzimidazole | 0.8 | 1.5 | 0.4 | 0.8 | 1.2 |

TABLE III.—POST-EMERGENCE
[Pounds per acre for 95% control of growing weeds]

| | Wild Oats | Crab-grass | Fiddle-neck | Chick-weed | Cress |
|---|---|---|---|---|---|
| 5-methylsulfonyl-2-trifluoromethylbenzimidazole | 7.0 | 8.5 | 8.5 | 7.5 | 1.3 |
| 5-ethylsulfonyl-2-trifluoromethylbenzimidazole | >2.5 | >2.5 | 2.3 | 1.7 | >2.5 |

I claim as my invention:
1. 2 - trifluoromethyl - 5 - alkylsulfonyl benzimidazole wherein the alkyl radical has up to 2 carbon atoms.
2. t-trifluoromethyl-5-methylsulfonyl benzimidazole.
3. 2-trifluoromethyl-5-ethylsulfonyl benzimidazole.

References Cited

FOREIGN PATENTS 659,384  8/1965  Belgium.

HENRY R. JILES, *Primary Examiner.*

N. TROUSOF, *Assistant Examiner.*